United States Patent
Koskinen et al.

(10) Patent No.: US 7,502,362 B1
(45) Date of Patent: Mar. 10, 2009

(54) METHOD FOR MAINTAINING A DATA TRANSMISSION CONNECTION

(75) Inventors: Topi Koskinen, Tampere (FI); Mikko Virta, Tampere (FI); Ari Koivisto, Tampere (FI)

(73) Assignee: Nokia Corporation, Espoo (FI)

( * ) Notice: Subject to any disclaimer, the term of this patent is extended or adjusted under 35 U.S.C. 154(b) by 667 days.

(21) Appl. No.: 09/697,395

(22) Filed: Oct. 27, 2000

(30) Foreign Application Priority Data

Oct. 28, 1999 (FI) .................................. 19992329

(51) Int. Cl.
*H04L 12/56* (2006.01)
*G06F 15/16* (2006.01)

(52) U.S. Cl. ........................................ 370/352; 709/227

(58) Field of Classification Search ................. 370/352, 370/426, 468, 465, 331; 455/403, 426, 436; 379/48, 207.01, 215.01
See application file for complete search history.

(56) References Cited

U.S. PATENT DOCUMENTS

| 4,995,074 | A | * | 2/1991 | Goldman et al. | |
|---|---|---|---|---|---|
| 5,711,012 | A | * | 1/1998 | Bottoms et al. | 455/557 |
| 5,745,695 | A | | 4/1998 | Gilchrist et al. | 395/200.57 |
| 5,812,751 | A | * | 9/1998 | Ekrot et al. | 714/4 |
| 5,982,774 | A | * | 11/1999 | Foladare et al. | 379/93.35 |
| 5,995,825 | A | * | 11/1999 | Hietalahti | 370/401 |
| 6,058,178 | A | * | 5/2000 | McKendry et al. | 379/212.01 |
| 6,081,592 | A | * | 6/2000 | Battle | |
| 6,118,768 | A | * | 9/2000 | Bhatia et al. | 370/254 |
| 6,122,263 | A | * | 9/2000 | Dahlin et al. | 370/329 |
| 6,188,886 | B1 | * | 2/2001 | Macaulay et al. | 455/415 |
| 6,198,945 | B1 | * | 3/2001 | Chen et al. | 455/560 |
| 6,253,249 | B1 | * | 6/2001 | Belzile | 709/249 |
| 6,295,341 | B1 | * | 9/2001 | Muller | 379/88.18 |
| 6,353,611 | B1 | * | 3/2002 | Norris et al. | 370/356 |
| 6,377,668 | B1 | * | 4/2002 | Smock et al. | 379/142.08 |
| 6,384,853 | B1 | * | 5/2002 | Shaffer et al. | 715/867 |
| 6,463,078 | B1 | * | 10/2002 | Engstrom et al. | 370/466 |
| 6,529,497 | B1 | * | 3/2003 | Hjelm et al. | 370/347 |
| 6,560,239 | B1 | * | 5/2003 | Frid et al. | 370/426 |
| 6,574,239 | B1 | * | 6/2003 | Dowling et al. | 370/469 |
| 6,577,722 | B1 | * | 6/2003 | Lippincott | 379/215.01 |
| 6,594,252 | B1 | * | 7/2003 | Barany et al. | 370/347 |
| 6,608,832 | B2 | * | 8/2003 | Forslow | 370/353 |
| 6,643,689 | B2 | * | 11/2003 | Rode et al. | 709/209 |
| 2002/0097710 | A1 | * | 7/2002 | Burg | 370/352 |
| 2003/0002512 | A1 | * | 1/2003 | Kalmanek et al. | 370/401 |

FOREIGN PATENT DOCUMENTS

| EP | 0891115 A1 | 1/1999 |
|---|---|---|
| WO | WO 97/26764 | 7/1997 |
| WO | WO 99/04582 | 1/1999 |
| WO | WO 00/03554 | 1/2000 |

* cited by examiner

*Primary Examiner*—Gregory B Sefcheck
(74) *Attorney, Agent, or Firm*—Perman & Green, LLP

(57) ABSTRACT

The invention relates to a method for maintaining a first data transmission connection from a terminal (MS) to a telecommunication network (NW1). In the method, at least a second data transmission connection is also set up between said terminal (MS) and telecommunication network (NW1). In the method, the first data transmission connection is interrupted for the time of the second data transmission connection. Furthermore, in the method, a message for maintaining the first data transmission connection is set up in the terminal (MS) in connection with setting up of the second data transmission connection. The generation of said message for maintaining the first data transmission connection is started in the terminal (MS).

19 Claims, 5 Drawing Sheets

METHOD FOR MAINTAINING A DATA TRANSMISSION CONNECTION

Figure 1A:
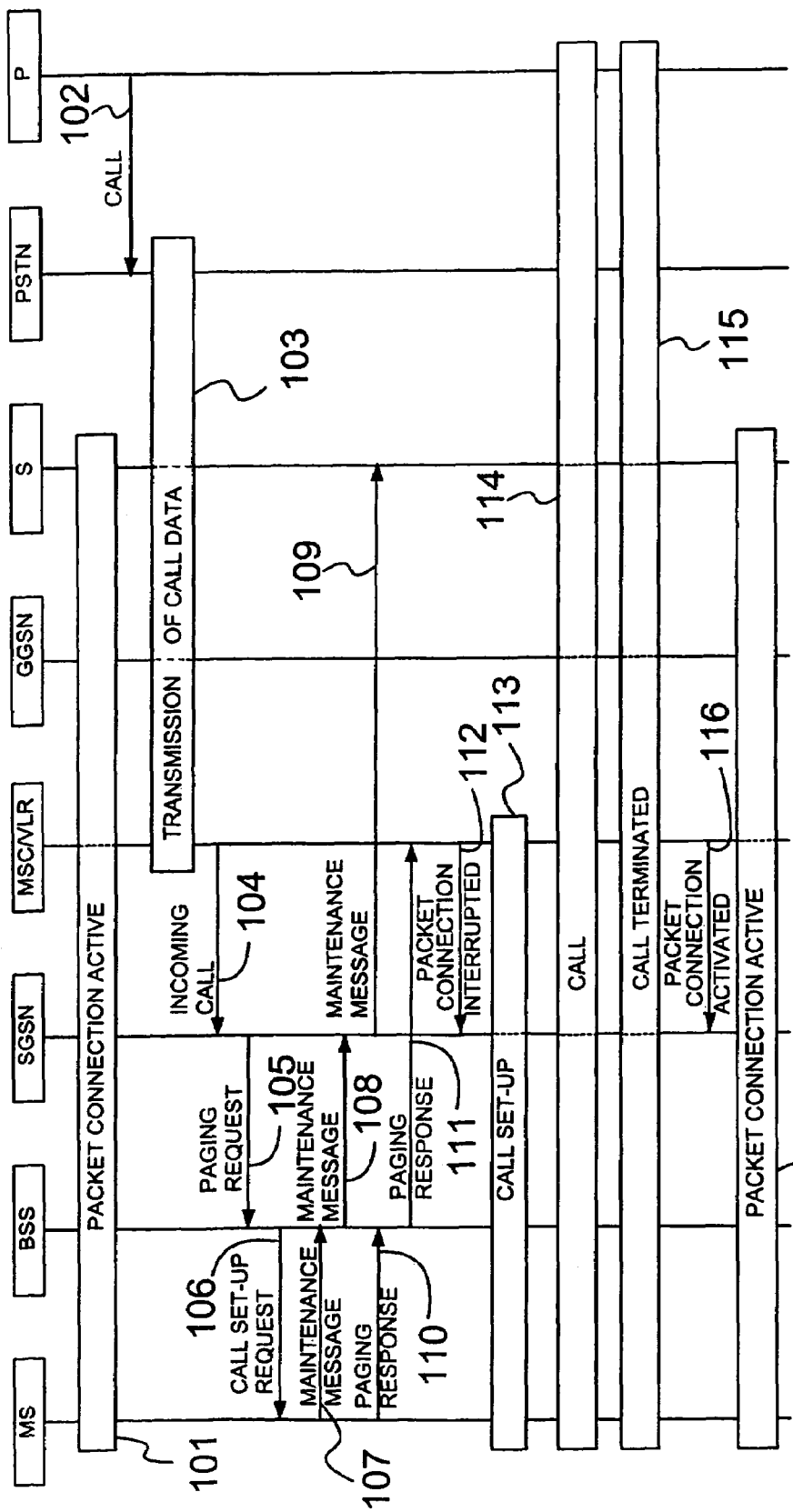

The present invention relates to a method for maintaining a first data transmission connection from a terminal to a telecommunication network, in which method also at least a second data transmission connection is formed between said terminal and telecommunication network, and in which method the first data transmission connection is interrupted for the time of the second data transmission connection. The invention also relates to a terminal which comprises means for setting up a connection to a telecommunication network, comprising means for setting up a first data transmission connection between the telecommunication network and said terminal, means for setting up a second data transmission connection between the telecommunication network and the wireless terminal, and means for interrupting the first data transmission connection for the time of the second data transmission connection. Furthermore, the invention relates to a communication system which comprises at least one telecommunication network and at least one terminal, means for setting up a first data transmission connection between the telecommunication network and said terminal, means for setting up a second data transmission connection between the telecommunication network and the terminal, and means for interrupting the first data transmission connection for the time of the second data transmission connection.

In mobile communication systems, such as the GSM mobile communication system, the possibility is under development for a packet-switched connection in addition to a convention circuit-switched connection. In the GSM mobile communication system, a so-called GPRS service. (General Packet Radio Service) is under development, to implement this packet-switched connection. The GPRS service makes it possible to use e.g. the IP protocol (Internet Protocol) as well as the X.25 communication protocol, the transmission of short messages (SMS, Short Message Service), the transmission of e-mail, as well as WAP applications (Wireless Application Protocol). Such a packet-form data transmission connection allows a communication method which is more effective than the circuit-switched connection, particularly for asynchronous data transmission, because to use the packet-switched connection, the resources of the mobile communication system are not allocated for the whole connection but only for the time required for the transmission of the packets. Instead, in a circuit-switched connection, the connection is allocated for the whole connection time. By means of a packet-switched connection, the user of a wireless communication device can e.g. keep an e-mail application activated all the time, wherein the user will at once notice an incoming e-mail message. Because the packet-switched connection allocates resources only according to the need, it can also be less expensive for the user with respect to the call costs when compared to a situation in which a circuit-switched connection is used.

For a wireless communication device of the GPRS system, three operation modes are defined: class A, class B and class C. Wireless communication devices can be classified into these classes according to the type of the packet network properties implemented in them. Wireless communication devices of class A can use GPRS services and other GSM services simultaneously. Wireless communication devices of class B can observe signals of the control channel of the GPRS network and the GSM network simultaneously, but they can only use either GPRS services or GSM services at a time. Wireless communication devices of class C can use a circuit-switched connection and a packet-switched connection, but not simultaneously.

In practice, a wireless communication device of class B can receive messages related to forming a circuit-switched connection even when the wireless communication device is using GPRS services, e.g. when a packet connection is active. The wireless communication device can thus e.g. receive a message informing about an incoming call (CS paging), but it cannot operate in a circuit-switched connection and in a packet-switched connection simultaneously. Thus, in a situation in which a message related to a circuit-switched connection is coming into the wireless communication device, the packet connection is set to a standby state for the time of receiving the message and a circuit-switched connection to be possibly formed, until the circuit-switched connection is terminated. In an ideal situation, this means that the wireless communication device can change its mode between a packet-switched connection and a circuit-switched connection and, after the change, continue from the operating state in which the wireless communication device was at the time of the interruption. In practice, however, it has been found that applications using a packet connection, such as e-mail or e.g. an FTP application used for the transmission of data files, are cut off even after a relatively short interruption of the connection. For example, in some known e-mail protocols, such as POP3 (Post Office Protocol) and IMAP4 (Internet Message Access Protocol), messages must be transmitted at intervals during the connection, to prevent the connection from being cut off. Such a property is used e.g. for the reason that the connection is not unnecessarily left active. If the e-mail server does not receive such a message within a predetermined time, the server deduces that the connection has been cut off or the terminal is no longer active, wherein the server cuts off the connection. When the POP3 protocol is used, the connection can be cut off even after an interruption of about 10 minutes, and when the IMAP4 protocol is used, an interruption of about 30 minutes may cause cutting off of an e-mail connection. After the connection is cut off, the user must set up an e-mail connection again and give his/her user identification and password, which makes the use of the e-mail application slower.

Thus, in a situation in which the wireless communication device has a packet connection active and there is an incoming call to the wireless communication device, the packet connection is set in a standby state. Thus, it is not possible to send the above-mentioned messages maintaining the packet connection from wireless communication devices of prior art, wherein the packet connection may be cut off. The packet connection can be cut off even during a considerably shorter call than the above-mentioned 10 or 30 minutes. This is possible for example when the call is coming in a moment before it is time to send a message for maintaining the connection. It is even possible that the connection is cut off before the user has even had time to answer the call.

The above-mentioned problem also occurs in a situation in which the user of a wireless communication device sets up a circuit-switched connection, e.g. a speech call, in a situation in which there is a packet connection active in the wireless communication device. Even in this case, the circuit-switched connection prevents the transmission of messages maintaining the packet connection, which may result in cutting off of the packet connection even during a short call. One possibility to prevent cutting off of the packet connection is thus to start the call first after sending the message maintaining the packet connection. However, the user may not necessarily even know about such a property and, on the other hand, it is not appropriate to expect that the user always remembers, when setting up a call, to send a message maintaining the packet connection first.

In practical applications, this time-out can be implemented for example so that the server S is provided with a packet connection specific maintenance counter or the like, whose value is changed at intervals. If this maintenance counter reaches a predetermined value, e.g. zero, the server S deduces that the terminal or the application using the packet connection of the terminal is no longer in operation, wherein there is reason to cut off the packet connection.

Operations have also been developed for switching centres of public switched telecommunication networks, whereby an ongoing call can be set on hold (interrupted) to start another call. Thus, after the end of the second call, the call that was on hold can be continued again. Further, with a call waiting operation, the centre of the telephone network can inform about an incoming call in a situation in which the user has a call going on. The user can either set the ongoing call on hold and answer the incoming call, or continue the ongoing call.

The problem of cutting off of a data transmission connection, mentioned above in this description, can also occur in a public switched telecommunication network, to which the terminal is in a public switched communication connection e.g. by means of a modem. The user of the terminal has, for example, set up a first data transmission connection via the telecommunication network to the Internet network to browse the home pages of different service providers, to search for information, to read and/or write e-mail, etc. By means of said operation to hold on a call, the ongoing first data transmission connection can be interrupted e.g. to make a call or to answer an incoming call. The problem in this case is also for example that said interrupted data transmission connection can be cut off before it is activated again.

It is an aim of the present invention to provide a method and a system as well as a terminal in which the cutting off of a first data transmission connection during a second data transmission connection can be delayed or even prevented. The invention is based on the idea that when the first data transmission connection is active, a message maintaining the first data transmission connection is transmitted from the terminal before the second data transmission connection is set up. The method according to the present invention is characterized in that in the method, a message for maintaining the first data transmission connection is set up in connection with setting up the second data transmission connection, and that the setting up of the message maintaining the first data transmission connection is started in the terminal. The terminal according to the present invention is characterized in that the terminal further comprises at least means for starting the setting up of a message maintaining the first data transmission connection in connection with setting up the second data transmission connection. The communication system according to the present invention is characterized in that the communication system further comprises at least means for setting up a message maintaining the first data transmission connection and means for starting the setting up of the message maintaining the first data transmission connection in connection with setting up of the second data transmission connection.

The present invention gives significant advantages. By applying the method of the invention, it is possible to avoid cutting off of a packet connection particularly in situations in which the request to set up a circuit-switched connection comes right before the moment to transmit a message necessary for maintaining the connection. Thus, the circuit-switched connection can be active for a longer time, irrespective of the moment of setting up of the connection. Thus, the probability of cutting off of the packet connection is significantly lower than in solutions of prior art. In the solution according to the invention, the user is expected to conduct no special operations when setting up a circuit-switched connection.

Figure 1B:
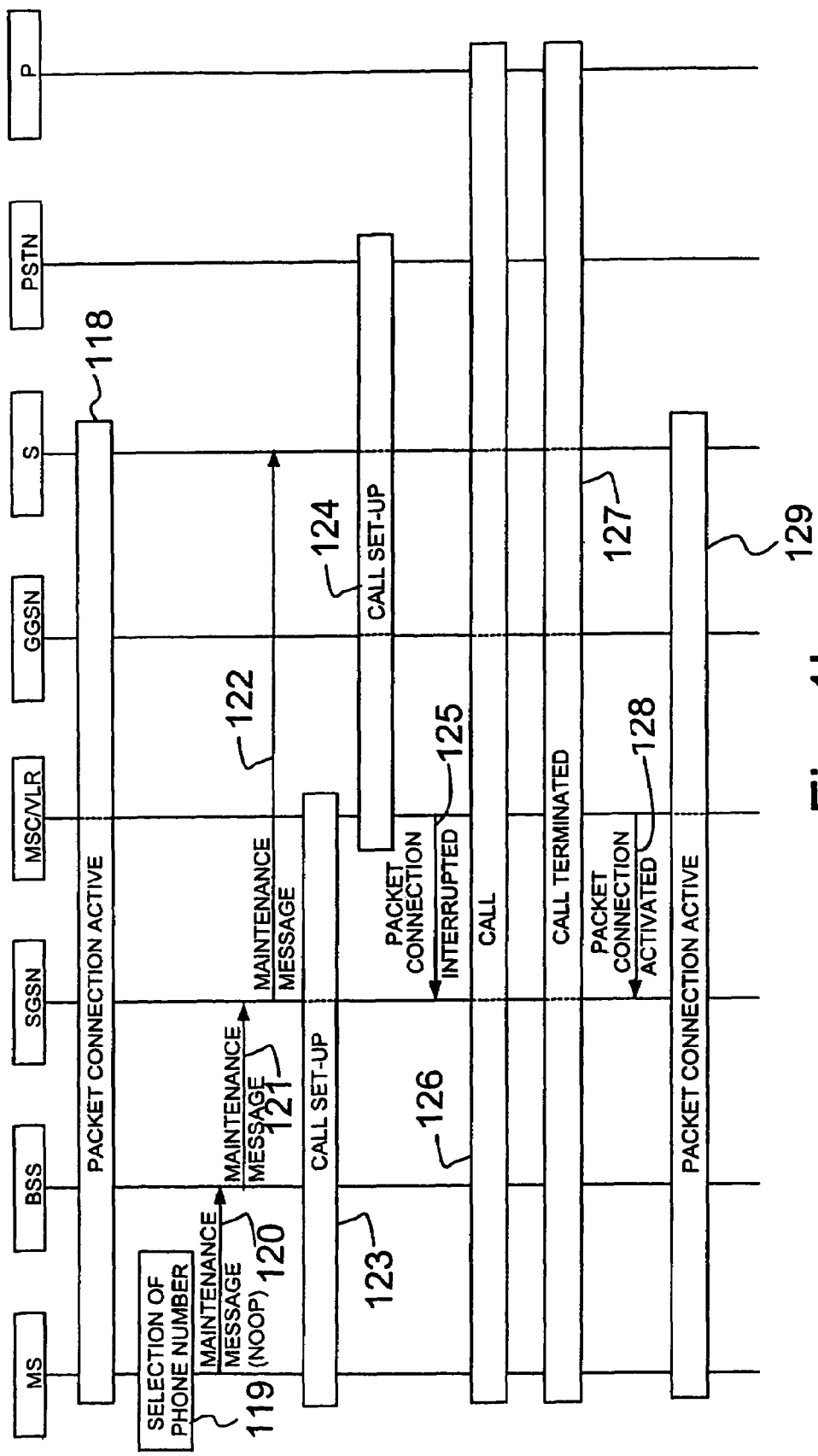
Figure 2A:
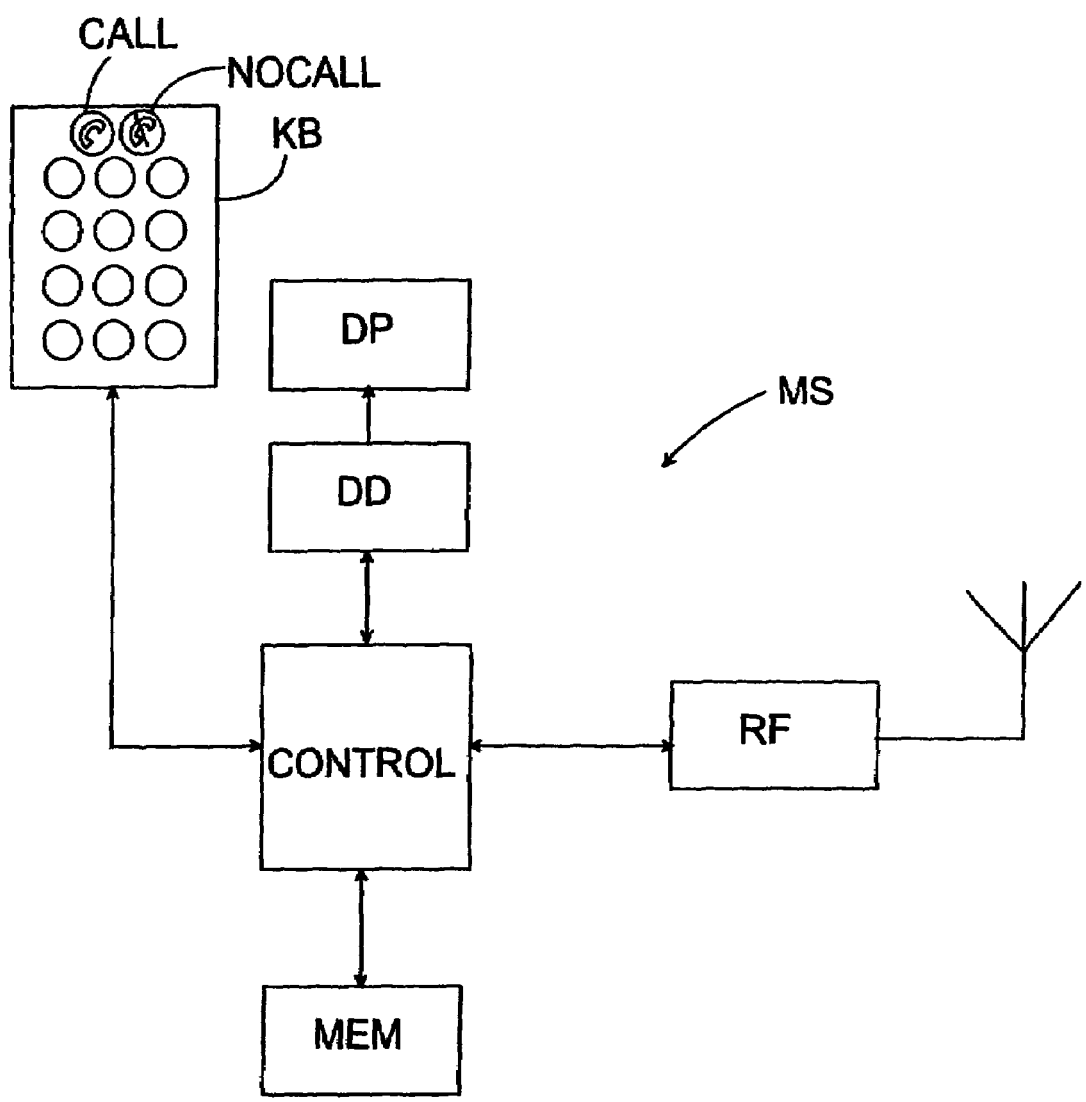
Figure 2B:
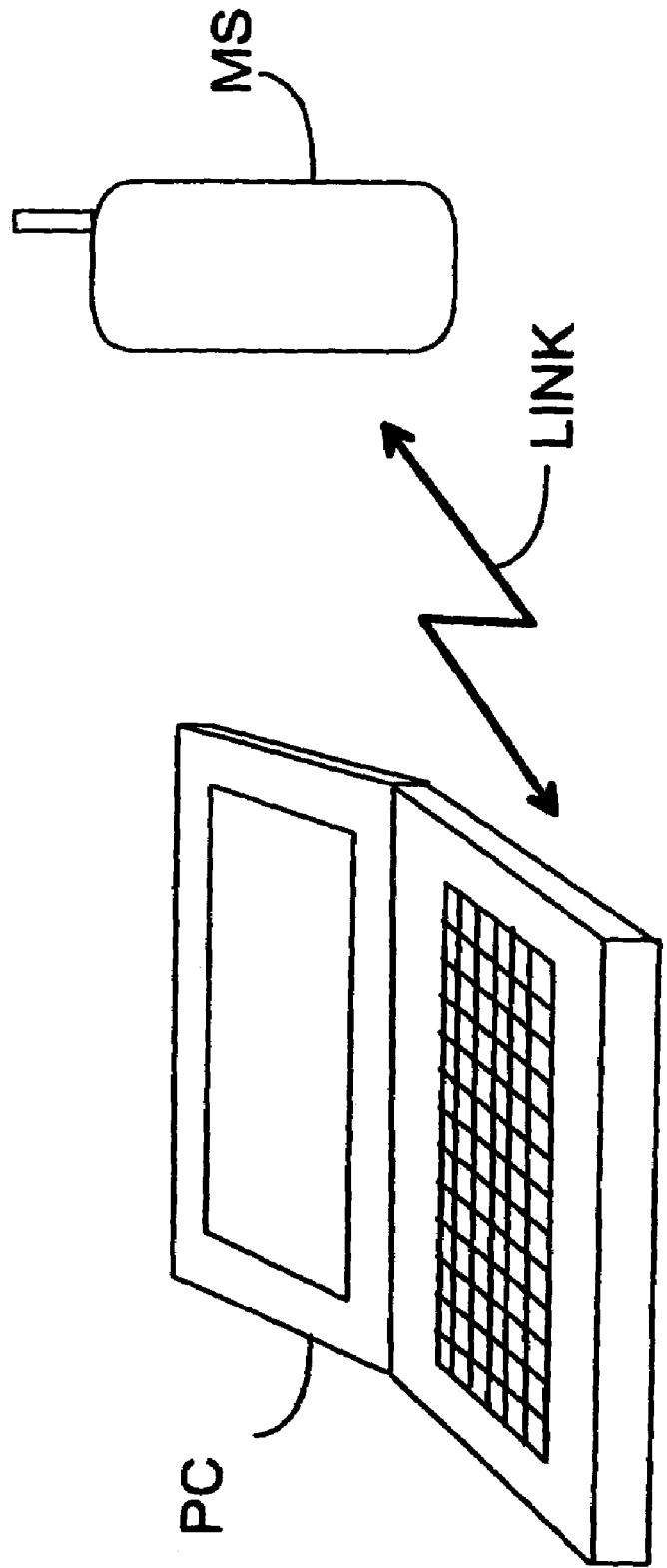
Figure 3:
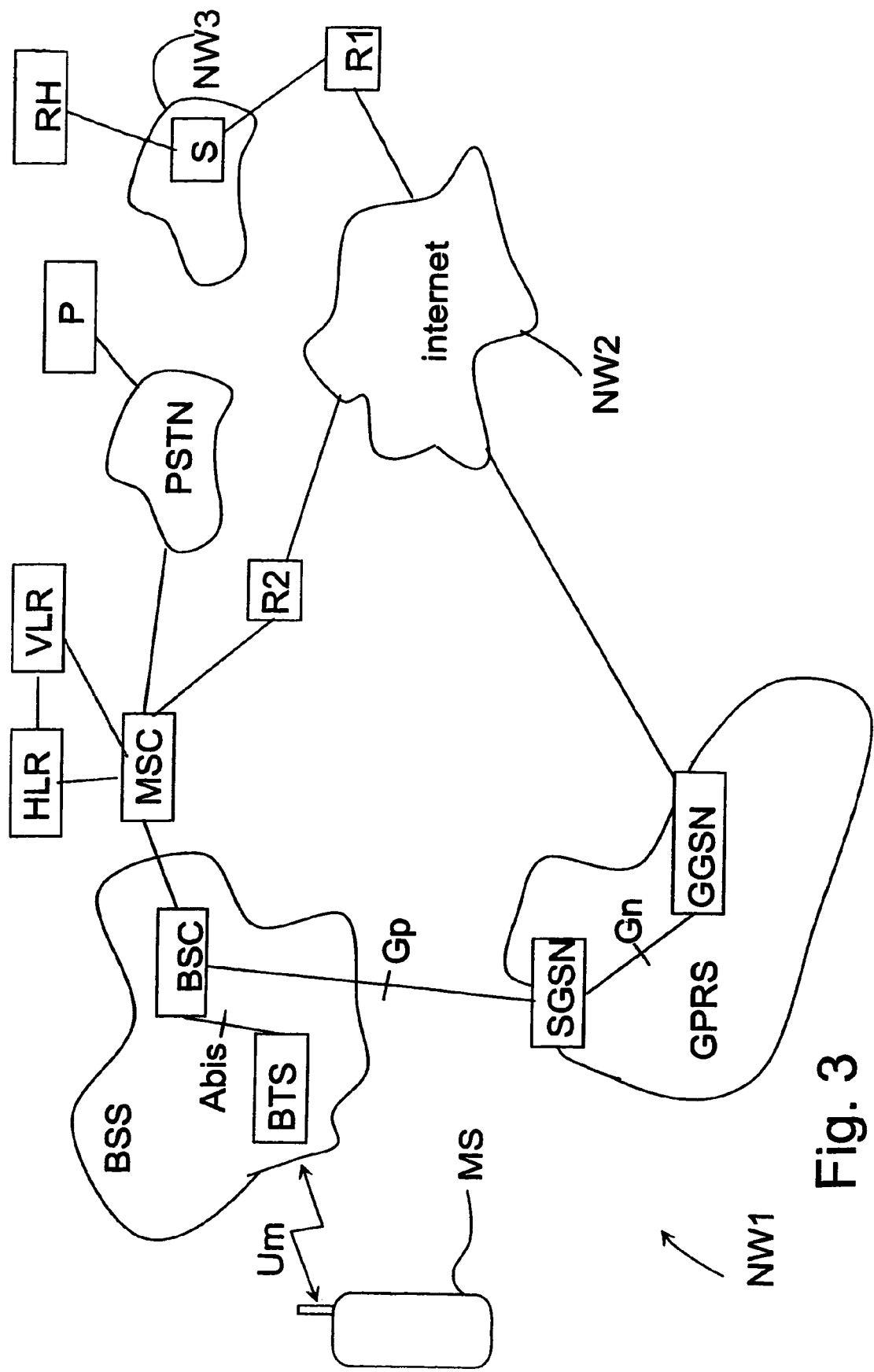

In the following, the invention will be described in more detail with reference to the appended drawings, in which FIG. 1a shows a method according to an advantageous embodiment of the invention in a situation of an incoming call, in a reduced signalling chart, FIG. 1b shows a method according to an advantageous embodiment of the invention in a situation of an outgoing call, in a reduced signalling chart, FIG. 2a shows, in a reduced block chart, a terminal according to an advantageous embodiment of the invention, FIG. 2b shows, in a reduced block chart, a terminal according to another advantageous embodiment of the invention, and FIG. 3 shows a mobile communication system in which the invention can be advantageously applied.

FIG. 1a shows, in a reduced signalling chart, the operation of the method according to an advantageous embodiment of the invention in a mobile communication system NW1 of FIG. 3 in a situation in which a packet connection is active and a wireless terminal MS receives signalling data related to a circuit-switched connection. In a corresponding manner, FIG. 1b shows, in a reduced signalling chart, the operation of the method according to an advantageous embodiment of the invention in a situation in which a packet connection is active and the user starts to set up a circuit-switched connection from a wireless terminal MS to a mobile communication network NW1.

The user has set up a packet connection to the mobile communication system with the wireless terminal MS for example by starting an e-mail application or a WEB browser application with a data processor. By means of the WEB browser application, the user can study e.g. data contained in a server S coupled to the Internet data network NW2 via a router R1 and a local area network NW3, which is known as such. The user can also receive e.g. an e-mail message transmitted from a work station coupled to the local area network NW3.

FIG. 2a shows a terminal MS according to an advantageous embodiment of the invention in a reduced block chart. In this example, the terminal is a wireless terminal. The figure contains some functional blocks necessary for describing the invention. The wireless terminal MS comprises a processor block CONTROL which can be implemented with one or more processors, such as a microprocessor, a digital signal processing unit, etc., which is known as such. This processor block CONTROL can also be arranged as a part of a so-called application specific integrated circuit (ASIC), in which it is also possible to implement other functions of the wireless terminal MS. For data storage, the wireless terminal MS has a memory MEM, such as a read only memory, a random access memory, and/or a non-volatile random access memory. A radio part RF comprises the necessary means for implementing radio data transmission to a base transceiver station BTS. Furthermore, the wireless terminal MS preferably comprises a keyboard KB, a display DP, as well as a display driver DD. In practice, the wireless terminal MS can be implemented in a variety of ways. The wireless terminal MS is for example a wireless communication device with data processing properties, such as Nokia 9110 Communicator, or the wireless terminal MS consists of a wireless communication device and a data processor, which are arranged in a data transmission connection to each other. An example of this is presented in a reduced manner in the appended FIG. 2b. In FIG. 2b, the data transmission connection is presented as an arrow which is indicated with a reference LINK. In practical applications, this data transmission connection can be a wired connection or a wireless connection, such as an infrared connection or a radio connection. Another example of such a wireless terminal MS is a portable computer, to which is coupled a card-operated wireless communication device, such as a GSM mobile phone. The wireless terminal MS is equipped with means for setting up both a circuit-switched connection (CS) and a packet-switched connection to the mobile communication system NW1.

FIG. 3 shows, in a reduced block chart, a mobile communication system NW1, in which the application can be advantageously applied. This mobile communication system NW1 comprises the properties of the GSM mobile communication system and the GPRS system, but it is obvious that the invention can also be applied in other mobile communication systems, in which there is both a packet connection and a circuit-switched connection available. FIG. 3 shows the blocks which are essential for the operation of the mobile communication system NW1. A serving GPRS support node SGSN controls the operation of the packet transmission service on the side of the cellular network. The serving GPRS support node SGSN takes care of logging in and out of the wireless communication device MS, updating of the location of the wireless communication device MS, and forwarding the data packets to the correct addresses. The wireless communication device MS is coupled to a base station subsystem BSS via a radio interface Um. The base station subsystem is coupled to the serving GPRS support node SGSN by means of a BSS-SGSN interface Gp. In the base station subsystem BSS, a base transceiver station BTS and a base station controller BSC are coupled to each other by means of a BTS-BSC interface Abis. The serving GPRS support nodes SGSN can communicate with other serving GPRS support nodes SGSN by means of a gateway GPRS support node GGSN.

Wireless communication devices communicate with base transceiver stations BTS by means of an air interface (radio interface) Um. The base transceiver stations are controlled by base station controllers BSC which communicate with a mobile switching centre MSC. The base station controller BSC and the base transceiver stations BTS coupled therewith are also called a base station subsystem BSS. The interface used in a circuit-switched connection between the mobile switching centre MSC and the base station subsystem BSS is called interface A. In a corresponding manner, the interface between the base station controller BSC and the base transceiver station BTS is called interface Abis. The mobile switching centre MSC takes care of e.g. the control of incoming and outgoing calls in the same way as a switching centre of a public switched telephone network PSTN. Furthermore, the mobile switching centre MSC takes care of the operations necessary in mobile telecommunication, such as the control of the location of the mobile communication device e.g. by means of a home location register HLR and a visitor location register VLR. Via the mobile switching centre MSC it is also possible to set up a circuit-switched connection e.g. to the Internet network NW2 preferably via one or several routers R2.

In the following, the operation of the method according to an advantageous embodiment of the invention will be described in the case of an incoming call with reference to FIG. 1a. A packet-switched connection is activated in the wireless terminal MS, wherein information can be transmitted in packets between the mobile communication system NW1 and the wireless terminal MS in a way known as such. This is illustrated by block 101 in the signalling chart of FIG. 1a. When there is an incoming call to the wireless terminal MS, e.g. from a phone P of a public switched telephone network PSTN (arrow 102), the telecommunication network PSTN transmits data about the call to the mobile switching centre MSC of the mobile communication network NW1 in a way known as such (block 103). The mobile switching centre MSC transmits a message about the incoming call to the serving GPRS support node SGSN (paging). This is indicated by arrow 104 in FIG. 1a. The serving GPRS support node SGSN transmits a message to request for setting up of a circuit-switched connection (paging request) to the base station subsystem BSS to which the wireless terminal MS is coupled at that moment (arrow 105). In the determination of the location of the wireless terminal MS at each time, preferably the home location register HLR and/or the visitor location register VLR are used, if necessary, in a way known as such. The base station subsystem BSS transmits the message to request for setting up of a circuit-switched connection from the base transceiver station BTS further to the wireless terminal MS (arrow 106), in which the message is received and interpreted. The wireless terminal MS detects that there is an incoming call, wherein the packet-switched connection is interrupted for the time of the call. Before interrupting the packet connection, the wireless terminal MS transmits a message to maintain the packet connection. This can be implemented preferably in such a way that a "No Operation" command (NOOP), insignificant as such, is transmitted from the wireless terminal MS to the mobile communication network NW1 (arrow 107). The message is received at the base transceiver station BTS of the base station subsystem BSS and transmitted to the serving GPRS support node SGSN (arrow 108). The serving GPRS support node SGSN transmits the message further to the server S to which there is an active packet connection from the wireless terminal MS (arrow 109). Thus, a maintenance counter or the like (not shown) is reset in this server S, to monitor the state of the wireless terminal MS.

After said maintenance message is transmitted from the wireless terminal MS, the processing of the request to set up a circuit-switched connection is started. The wireless terminal MS informs the user that there is an incoming call. This can be done in a way known as such, with audio signals, a message to be formed on the display DP of the wireless terminal, etc. If the user intends to answer the call, the wireless terminal MS transmits a corresponding reply message to the paging request (paging response) to the base station subsystem BSS (arrow 110).

The base station subsystem BSS transmits a connection request further to the mobile switching centre MSC (arrow 111), wherein the mobile switching centre MSC transmits information about the interruption of the packet connection to the serving GPRS support node SGSN (arrow 112). The mobile switching centre MSC, the base station subsystem BSS and the wireless terminal MS perform signalling required for setting up of a call. This is presented as block 113 in the appended FIG. 1a, and it is known as such for anyone skilled in the art, wherein its more detailed discussion in this context is rendered unnecessary.

The call between the wireless terminal MS and the calling telecommunication terminal P is presented by block 114 in FIG. 1a. After the call is terminated, the corresponding signalling takes place to terminate the circuit-switched connection (block 115). After this, the mobile switching centre MSC transmits information about activating the packet connection to the serving GPRS support node SGSN (arrow 116), wherein the packet connection can be continued (block 117).

FIG. 1*b* shows the operation of the method according to an advantageous embodiment of the invention in a situation in which the user starts to set up a circuit-switched connection when a packet connection is active. A packet-switched connection is activated in the wireless terminal MS, wherein information can be transmitted in packets between the mobile communication system NW1 and the wireless terminal MS in a way known as such. This is presented by block 118 in the signalling chart of FIG. 1*b*. The user starts to set up a call by dialing a telephone number (block 119). Preferably after the user has pressed the send key, i.e. the so-called handset up key CALL, the wireless terminal MS transmits a packet connection maintenance message to the mobile communication network NW1 (arrow 120). Also in this situation, this maintenance message can preferably be the No Operation command NOOP. The message is received at the base transceiver station BTS of the base station subsystem BSS and is transmitted to the serving GPRS support node SGSN (arrow 121). The serving GPRS support node SGSN transmits the message further to the server S, to which there is an active packet connection from the wireless terminal MS (arrow 122). Thus, a maintenance counter or the like (not shown) is reset in this server S, to monitor the state of the wireless terminal MS. After this, the packet-switched connection is interrupted for the duration of the call.

After said maintenance message is transmitted from the wireless terminal MS, the processing of the request to set up a circuit-switched connection is started. This takes place in a way known as such as signalling between the wireless terminal MS and the mobile communication network NW1, represented by block 123 in FIG. 1*b*. The signalling to set up a call also contains data about the telephone number selected by the user. Thus, the mobile switching centre MSC takes care of setting up the call with the telecommunication network in which the telephone selected by the user is located (block 124). In this example, the telephone is a phone P connected to a public switched telephone network PSTN, but it is obvious that the phone called can also be a telecommunication terminal coupled to the same or another mobile communication system NW1.

In connection with setting up of the call, the mobile switching centre MSC transmits information about interrupting the packet connection to the serving GPRS support node SGSN (arrow 125).

The call between the wireless terminal MS and the calling telecommunication terminal P is presented by block 126. After termination of the call, a corresponding signalling is conducted to terminate the circuit-switched connection (block 127). After this, the mobile switching centre MSC transmits information about activating the packet connection to the serving support node SGSN (arrow 128), wherein the packet connection can be continued (block 129).

It is obvious that the above-presented principles can also be applied in a situation in which the call is not answered. Thus, the call attempt fails and the packet connection can be activated after the caller has given up the attempt to call, e.g. put down the handset or pressed the so-called handset down key NOCALL. Also in this situation, it is largely possible to apply the block charts of FIGS. 1*a* and 1*b*, except for the call block 114, 126.

The method according to the invention can be largely implemented in the software as program commands of that functional part of the wireless terminal MS in which the application using the packet connection is used. For example, if the wireless terminal MS used is a wireless communication device with data processing properties, such as Nokia 9110 Communicator, the operations of the method according to the invention can be largely implemented as program commands of the wireless communication device. If the wireless terminal MS consists of a wireless communication device and a data processor, or a portable computer to which is coupled a card-like wireless communication device, the operations of the method according to the invention can be largely implemented as program commands of the data processor. In such an application, the wireless terminal transfers information about the incoming/outgoing call to the data processor, wherein the data processor generates a message to maintain the packet connection and transfers it to the wireless terminal. From the wireless terminal, the maintenance message is transmitted to the mobile communication network NW1.

Even though the invention has been described above primarily in connection with wireless terminals and mobile communication networks, the invention can also be applied in wired data transmission connections, such as connections between a wired terminal and a public switched telephone network. The wired terminal is e.g. a data processor comprising a modem.

The invention can also be applied in such a way that the message for maintaining the first data transmission connection is not generated in the terminal MS but in the telecommunication network NW1. Thus, the terminal MS sets up the generation of the maintenance message preferably in such a way that it transmits to the telecommunication network information about the need to generate a maintenance message. In the telecommunication network NW1, this message is received and interpreted, after which the telecommunication network NW1, e.g. the serving support node SGSN, generates the maintenance message. The maintenance message is transmitted from the telecommunication network NW1 e.g. to a server S, as already presented above in this description.

The present example is not limited solely to the embodiments presented above, but it can be modified within the scope of the appended claims.

The invention claimed is:

1. A method for maintaining a data transmission connection between a terminal and an application server connected to a telecommunication network, said method comprising:
    establishing an application level data transmission connection between said terminal and said application server by using a packet data telecommunications service of the telecommunication network as a bearer service;
    establishing a circuit-switched telecommunications connection between said terminal and said telecommunication network;
    interrupting the packet data telecommunications service for the time of the circuit-switched telecommunications connection;
    setting up a message for maintaining the data transmission connection between said terminal and said application server in connection with establishing the circuit-switched telecommunications connection;
    wherein said message comprises a command to reset an application level time-out counter in the application server; and
    transmitting said message to the application server before starting to establish the circuit-switched telecommunications connection.

2. The method according to claim 1, further comprising:
    generating said message for maintaining the data transmission connection in the terminal, and transmitting said message for maintaining the data transmission connection from the terminal to the application server.

3. The method according to claim 1, wherein the setting up of said message for maintaining the first data transmission further comprises:
sending information about interrupting the first data transmission connection from the terminal to the application server.

4. The method according to claim 1, wherein said establishing the circuit-switched telecommunications connection comprises the user of the terminal selecting a telephone number, and transmitting said maintenance message after the selection of the telephone number, before said establishing of the circuit-switched telecommunications connection.

5. The method according claim 1, wherein the telecommunication network communicates with a local area network, and further comprising setting up the data transmission connection from the terminal to a server coupled to said local area network, wherein the telecommunication network transmits said maintenance message to said server.

6. The method according to claim 1, wherein the telecommunication network communicates with the Internet data network, and further comprising setting up the data transmission connection from the terminal to a server communicating with said Internet network, wherein the telecommunication network transmits said maintenance message to said Internet data network.

7. The method according to claim 1, wherein said maintenance message is supplemented with a "No Operation" command.

8. The method according to claim 1, wherein said terminal is a wireless terminal, and said telecommunication network is a mobile communication network.

9. A terminal which comprises:
a circuit configured to establish an application level data transmission connection to an application server connected to a telecommunication network by using a packet data telecommunications service of the telecommunication network as a bearer service;
a circuit configured to establish a circuit-switched telecommunications connection between the telecommunication network and said terminal;
a circuit configured to interrupt the packet data telecommunications service for the time of the circuit-switched telecommunications connection,
a circuit configured to automatically start the setting up of a message for maintaining the data transmission connection between the terminal and the application server in connection with establishing the circuit-switched telecommunications connection,
wherein said message comprises a command to reset an application level time-out counter in the application server; and
a transmitter configured to transmit said message to the application server before starting to establish the circuit-switched telecommunications connection.

10. The terminal according to claim 9, wherein the circuit configured to start the setting up of a message for maintaining the data transmission connection comprises a circuit configured to generate a message for maintaining the data transmission connection and a circuit configured to transmit the message for maintaining the data transmission connection.

11. The terminal according to claim 9, wherein
the circuit configured to start the setting up of a message for maintaining the data transmission connection comprises
a circuit configured to transmit information about interrupting the data transmission connection to the application server for generating said message for maintaining the data transmission connection.

12. The terminal according to claim 9, which further comprises:
a circuit configured to select a telephone number,
a circuit configured to add the selected telephone number to the message for setting up the circuit-switched telecommunications connection, and
a circuit configured to transmit the message requesting for setting up of the circuit-switched telecommunications connection to the telecommunication network, wherein the circuit configured to transmit the message for maintaining the data transmission connection comprises a circuit configured to transmit said maintenance message before transmitting said message requesting for setting up of the circuit-switched telecommunications connection.

13. The terminal according to claim 9, wherein said terminal is a wireless terminal.

14. The terminal according to claim 9, wherein said terminal comprises a data processor, and that said circuit configured to set up the message for maintaining the data transmission connection is arranged in said data processor.

15. A communication system which comprises:
at least one telecommunication network, at least one application server coupled to the telecommunication network and at least one terminal;
a circuit configured to set up an application level data transmission connection between the application server and said terminal by using a packet data telecommunications service of the telecommunication network as a bearer service,
a circuit configured to set up a circuit-switched telecommunications connection between the telecommunication network and the terminal,
a circuit configured to interrupt the packet data telecommunications service for the time of the circuit-switched telecommunications connection,
a circuit configured to set up a message for maintaining the data transmission connection between the application server and said terminal;
a circuit configured to automatically start the setting up of the message maintaining the data transmission connection in connection with setting up of the circuit-switched telecommunications connection,
wherein said message comprises a command to reset an application level time-out counter in the application server; and
a circuit configured to transmit said message to the application server before starting to set up the circuit-switched telecommunications connection.

16. The communication system according to claim 15, further comprising a local area network, at least one server coupled to a local area network, a circuit configured to set up a data transmission connection between the telecommunication network and the local area network, and a circuit configured to transmit said maintenance message from the telecommunication network to said server.

17. The communication system according to claim 15, wherein said maintenance message is supplemented with a "No Operation" command.

18. The communication system according to claim 15, wherein said terminal is a wireless terminal, and said telecommunication network is a mobile communication network.

19. A computer-readable medium having stored thereon a computer program product, executable in a data processing device, for maintaining an application level data transmission connection between a terminal and an application server connected to a telecommunication network, the computer program product comprising:
- a computer program code section for establishing a data telecommunications connection to an application server connected to a telecommunication network by using a packet data telecommunications service of the telecommunication network as a bearer service;
- a computer program code section for establishing a circuit-switched telecommunications connection between the telecommunication network and said terminal;
- a computer program code section for interrupting the packet data telecommunications service for the time of the circuit-switched telecommunications connection;
- a computer program code section for automatically starting the setting up of a message for maintaining the data transmission connection between the terminal and the application server in connection with establishing the circuit-switched telecommunications connection;
- wherein said message comprises a command to reset an application level time-out counter in the application server; and
- a computer program code section for controlling the terminal to transmit said message to the application server before starting to establish the circuit-switched telecommunications connection.

* * * * *